United States Patent [19]
DeKoning et al.

[11] Patent Number: 5,860,091
[45] Date of Patent: Jan. 12, 1999

[54] METHOD AND APPARATUS FOR EFFICIENT MANAGEMENT OF NON-ALIGNED I/O WRITE REQUEST IN HIGH BANDWIDTH RAID APPLICATIONS

[75] Inventors: Rodney A. DeKoning; Gerald J. Fredin, both of Wichita, Kans.

[73] Assignee: Symbios, Inc., Fort Collins, Colo.

[21] Appl. No.: 671,863

[22] Filed: Jun. 28, 1996

[51] Int. Cl.[6] .................................................. G06F 12/00
[52] U.S. Cl. ............................................ 711/114; 711/113
[58] Field of Search ..................................... 395/438, 439, 395/440, 441, 497.01, 497.02, 497.04, 180, 182.04, 182.05; 711/111, 112, 113, 114, 170, 171, 173

[56] References Cited

U.S. PATENT DOCUMENTS

| | | | |
|---|---|---|---|
| 4,805,098 | 2/1989 | Mills, Jr. et al. | 395/250 |
| 5,274,799 | 12/1993 | Brant et al. | 395/182.04 |
| 5,315,602 | 5/1994 | Noya et al. | 371/40.4 |
| 5,357,622 | 10/1994 | Parks et al. | 395/444 |
| 5,408,644 | 4/1995 | Schneider et al. | 395/180 |
| 5,416,915 | 5/1995 | Mattson et al. | 395/441 |
| 5,420,983 | 5/1995 | Noya et al. | 395/850 |
| 5,446,855 | 8/1995 | Dang et al. | 395/401 |
| 5,459,842 | 10/1995 | Begun et al. | 395/250 |
| 5,506,977 | 4/1996 | Jones | 395/482 |
| 5,519,849 | 5/1996 | Malan et al. | 395/500 |
| 5,586,264 | 12/1996 | Belknap et al. | 395/200.08 |
| 5,600,816 | 2/1997 | Oldfield et al. | 395/440 |
| 5,613,085 | 3/1997 | Lee et al. | 395/441 |

OTHER PUBLICATIONS

Patterson, David A. et al. "Introduction to Redundant Arrays of Inexpensive Disks (RAID)" Proceedings of COMPCON Spring '89 IEEE Computer Society Int'l Conference, pp. 112–117, 1989.

Mogi, Kazuhiko et al. "Dynamic Parity Stripe Reorganizations for RAID5 Disk Arrays", Proceedings of the 1994 Int'l Conference on Parallel and Distributed Information Systems, IEEE, pp. 17–26.

Friedman, Mark. "RAID Keeps Going and Going and . . . ", IEEE Spectrum, pp. 73–79, Apr. 1996.

A Case for Redundant Arrays of Inexpensive Disks (RAID); David A. Patterson et al.; Dec. 1987; pp. 1–24.

*Primary Examiner*—Tod R. Swann
*Assistant Examiner*—Conley B. King, Jr.
*Attorney, Agent, or Firm*—Daniel N. Fishman; Wayne P. Bailey

[57] ABSTRACT

Methods and associated apparatus in a RAID storage subsystem to enhance the performance of write operations for sequences of large buffers generally non-aligned with stripe boundaries in the RAID storage subsystem. In particular, the methods identify a starting non-aligned portion of each large buffer to be written to the RAID storage subsystem, an ending non-aligned portion of each large buffer to be written to the RAID subsystem, and a larger middle portion of the large buffer to be written to the RAID subsystem which is aligned with stripe boundaries of the RAID storage subsystem. The stripe-aligned middle portion is written to the RAID storage devices in a cache write through mode using stripe write operations to maximize data throughput. The starting and ending portions identified by the methods of the present invention are written to the cache memory in a write back mode such that they will eventually be posted to the RAID storage devices in due course through normal RAID processing. Special case processing of the methods of the present invention note the absence of a starting or ending non-aligned portions (e.g., a buffer having no non-aligned starting portion, or no non-aligned ending portion, or neither starting nor ending non-aligned portions).

16 Claims, 3 Drawing Sheets

FIG. 2
PRIOR ART

|  | DISK 1 | DISK 2 | DISK 3 | DISK 4 | DISK 5 |
|---|---|---|---|---|---|
| STRIPE 1 | BLOCK 1 | BLOCK 2 | BLOCK 3 | BLOCK 4 | PARITY 1-4 |
| STRIPE 2 | BLOCK 5 | BLOCK 6 | BLOCK 7 | PARITY 5-8 | BLOCK 8 |
| STRIPE 3 | BLOCK 9 | BLOCK 10 | PARITY 9-12 | BLOCK 11 | BLOCK 12 |
| STRIPE 4 | BLOCK 13 | PARITY 13-16 | BLOCK 14 | BLOCK 15 | BLOCK 16 |
| STRIPE 5 | PARITY 17-20 | BLOCK 17 | BLOCK 18 | BLOCK 19 | BLOCK 20 |
| STRIPE 6 | BLOCK 21 | BLOCK 22 | BLOCK 23 | BLOCK 24 | PARITY 21-24 |
| STRIPE 7 | BLOCK 25 | BLOCK 26 | BLOCK 27 | PARITY 25-28 | BLOCK 28 |
| STRIPE 8 | BLOCK 29 | BLOCK 30 | PARITY 29-32 | BLOCK 31 | BLOCK 32 |
| STRIPE 9 | BLOCK 33 | PARITY 33-36 | BLOCK 34 | BLOCK 35 | BLOCK 36 |
| STRIPE 10 | PARITY 37-40 | BLOCK 37 | BLOCK 38 | BLOCK 39 | BLOCK 40 |

FIG. 3

|  | DISK 1 | DISK 2 | DISK 3 | DISK 4 | DISK 5 |
|---|---|---|---|---|---|
| STRIPE 1 | BLOCK 1 | BLOCK 2 | BLOCK 3 1-A | BLOCK 4 1-B | PARITY 1-4 |
| STRIPE 2 | BLOCK 5 1-C | BLOCK 6 1-D | BLOCK 7 1-E | PARITY 5-8 | BLOCK 8 1-F |
| STRIPE 3 | BLOCK 9 1-G | BLOCK 10 1-H | PARITY 9-12 | BLOCK 11 1-I | BLOCK 12 1-J |
| STRIPE 4 | BLOCK 13 1-K | PARITY 13-16 | BLOCK 14 2-A | BLOCK 15 2-B | BLOCK 16 2-C |
| STRIPE 5 | PARITY 17-20 | BLOCK 17 2-D | BLOCK 18 2-E | BLOCK 19 2-F | BLOCK 20 2-G |
| STRIPE 6 | BLOCK 21 2-H | BLOCK 22 2-I | BLOCK 23 2-J | BLOCK 24 3-A | PARITY 21-24 |
| STRIPE 7 | BLOCK 25 3-B | BLOCK 26 3-C | BLOCK 27 3-D | PARITY 25-28 | BLOCK 28 3-E |
| STRIPE 8 | BLOCK 29 3-F | BLOCK 30 3-G | PARITY 29-32 | BLOCK 31 3-H | BLOCK 32 3-I |
| STRIPE 9 | BLOCK 33 3-J | PARITY 33-36 | BLOCK 34 3-K | BLOCK 35 3-L | BLOCK 36 3-M |
| STRIPE 10 | PARITY 37-40 | BLOCK 37 4-A | BLOCK 38 4-B | BLOCK 39 4-C | BLOCK 40 4-D |

METHOD AND APPARATUS FOR EFFICIENT MANAGEMENT OF NON-ALIGNED I/O WRITE REQUEST IN HIGH BANDWIDTH RAID APPLICATIONS

BACKGROUND OF THE INVENTION

1. Field of the Invention

The invention relates generally to control methods operable within a disk array subsystem (RAID) and in particular to methods operable within a disk array subsystem to simplify host computer RAID management and control software integration.

2. Background of the Invention

Modern mass storage subsystems continue to provide increasing storage capacities to fulfill user demands from host computer system applications. Due to this critical reliance on large capacity mass storage, demands for enhanced reliability are also high. Various storage device configurations and geometries are commonly applied to meet the demands for higher storage capacity while maintaining or enhancing reliability of the mass storage subsystems.

A popular solution to these mass storage demands for increased capacity and reliability is the use of multiple smaller storage modules configured in geometries that permit redundancy of stored data to assure data integrity in case of various failures. In many such redundant subsystems, recovery from many common failures is automated within the storage subsystem itself due to the use of data redundancy, error codes, and so-called "hot spares" (extra storage modules which may be activated to replace a failed, previously active storage module). These subsystems are typically referred to as redundant arrays of inexpensive (or independent) disks (or more commonly by the acronym RAID). The 1987 publication by David A. Patterson, et al., from University of California at Berkeley entitled *A Case for Redundant Arrays of Inexpensive Disks (RAID)*, reviews the fundamental concepts of RAID technology.

There are five "levels" of standard geometries defined in the Patterson publication. The simplest array, a RAID level 1 system, comprises one or more disks for storing data and an equal number of additional "mirror" disks for storing copies of the information written to the data disks. The remaining RAID levels, identified as RAID level 2,3,4 and 5 systems, segment the data into portions for storage across several data disks. One of more additional disks are utilized to store error check or parity information. A single unit of storage is spread across the several disk drives and is commonly referred to as a "stripe." The stripe consists of the related data written in each of the disk drive containing data plus the parity (error recovery) information written to the parity disk drive.

RAID storage subsystems typically utilize a control module that shields the user or host system from the details of managing the redundant array. The controller makes the subsystem appear to the host computer as a single, highly reliable, high capacity disk drive. In fact, the RAID controller may distribute the host computer system supplied data across a plurality of the small independent drives with redundancy and error checking information so as to improve subsystem reliability. Frequently RAID subsystems provide large cache memory structures to further improve the performance of the RAID subsystem. The cache memory is associated with the control module such that the storage blocks on the disk array are mapped to blocks in the cache. This mapping is also transparent to the host system. The host system simply requests blocks of data to be read or written and the RAID controller manipulates the disk array and cache memory as required.

In RAID level 5 subsystems (as well as other RAID levels) there is a penalty in performance paid when less than an entire stripe is written to the storage array. If a portion of a stripe is written to the RAID subsystem, portions of the same stripe may need to be read so that a new parity block may be computed and re-written to the parity disk of the array. In particular, the old data stored in the portion of the stripe which is to be overwritten as well as the old parity block associated therewith needs to be read from the storage subsystem so that the new parity block values may be determined therefrom. This process is often referred to as a read-modify-write cycle due to the need to read old data from the stripe, modify the intended data blocks and associated parity data, and write the new data blocks and new parity block back to the storage array. This performance penalty is avoided if the entire stripe is written. When an entire stripe is written (often referred to as a stripe write or full stripe write), the old data and old parity stored in the stripe to be overwritten are ignored. The new stripe data is written and a new parity block determined therefrom is written without need to reference the old data or old parity. A stripe write therefore avoids the performance penalty of read-modify-write cycles.

A significant class of RAID applications may be designated as high bandwidth applications. Video data capture is exemplary of such high bandwidth RAID storage applications. In video data capture applications, each video image (frame) comprises a significant volume of data. In addition, sequences of such video frames may be captured in rapid succession to simulate real-time video in the playback of the captured video frames. The captured video frames are stored in a RAID storage subsystem for later retrieval and replay.

In such high bandwidth RAID applications, data is typically read and written in very large blocks as compared to the typical unit of storage in the RAID subsystem. For example, a single high resolution (640×480 pixels), mono-color, video frame (two video scan fields), comprises over 300,000 bytes of uncompressed storage. For real-time video, a capture rate of 30 frames per second is desirable. A typical full color video capture stream therefore consists of sequential 1.3941 megabyte I/O write requests directed to the RAID storage subsystem.

When data written to a RAID storage subsystem is aligned with stripe boundaries of the RAID subsystem, higher performance may be maintained in the subsystem by using stripe write operations. However, maintaining such high performance is problematic when the data to be written to the storage subsystem is not aligned to stripe boundaries in the RAID subsystem. This typical request size does not readily align to typical stripe boundaries in a RAID storage subsystem. Typical stripe sizes in RAID subsystems are 32, 64, 128, or 256 kilobytes. In such cases, read-modify-write cycles are used by present RAID subsystems thereby reducing the performance of the RAID subsystem below the level required for sustaining high bandwidth applications such as real time video capture.

One solution to this problem as known in the art is to provide large buffer memories so that the non-aligned data may be cached until additional data is received from an attached computer. The cached data may then be written along with the additional received data in an efficient stripe write operation. A problem with this simplistic solution is that potentially large buffer memories may be required to store the non-aligned data until an additional I/O write request for an adjacent buffer is received. The buffer memory required to store two or more such large I/O write requests can be prohibitively costly in a RAID storage subsystem.

It is evident from the above discussion that an improved method and apparatus is required for sustaining RAID performance for high bandwidth storage applications having large I/O write request sizes.

SUMMARY OF THE INVENTION

The present invention solves the above and other problems, and thereby advances the useful arts, by providing methods and associated apparatus which efficiently manage the storage of large buffers in a RAID storage subsystem where the buffers are not aligned with stripe boundaries of the RAID array. In particular, the methods and associated apparatus of the present invention maximize the use of stripe writes in performing I/O write requests for large buffers (such as is common in video capture and other high bandwidth storage applications). The methods of the present invention treat all write requests that are not stripe-aligned as having three parts; namely, a starting fragment (also referred to herein as a starting portion), an ending fragment (also referred to herein as an ending portion), and a stripe-aligned middle portion. The starting fragment is that portion of the I/0 write request that starts non-aligned with a stripe boundary and ends at the first stripe boundary. The ending fragment is that portion of the I/O write request that starts at the end of the last aligned stripe the middle portion of the I/O write request data and ends at the end of the I/O write request storage buffer, again non-aligned with the stripe boundaries of the RAID subsystem. The stripe-aligned middle portion is the largest portion between the starting fragment and the ending fragment which both starts and ends aligned with stripe boundaries of the RAID subsystem.

The starting and ending fragments are written to the cache memory in a write-back mode and are posted therefrom to the storage array in the normal course of RAID cache management. The stripe-aligned middle portion is written to the disk array using stripe writes in a cache memory write through mode which bypasses the cache buffer memory. The ending fragment of an I/O write request remains in the cache buffer memory until a subsequent I/O write request provides an adjacent starting fragment which then permits writing of the adjacent starting and ending fragments in a stripe write operation.

In an alternate embodiment of the present invention, the full stripes written to the disk array (cache memory) are written in a write back mode but at a higher priority than other cached write operations. This assures that the full stripes are written (posted) to the disk quickly so as to maintain the benefit of the present invention wherein the required size of cache memory is minimized.

Special case boundary conditions are recognized by the methods of the present invention when there is no starting or ending fragment for a particular I/O write request (e.g., where the request starts or ends at a stripe boundary of the RAID subsystem). In addition, standard RAID control methods for managing write-back cache buffer memory assure that the first starting fragment, and last ending fragment, of a sequence of I/O write requests are eventually posted (written) from the cache buffer memory to the disk array. However, methods of the present invention detect when a starting fragment is to be added to the cache memory corresponding to a RAID location adjacent to, and following, the ending fragment of an earlier I/O write request. The combined data of such an ending fragment and an adjacent starting fragment are then posted to the disk array from the cache memory using an efficient stripe write operation.

The methods and associated apparatus of the present invention therefore maintain the required RAID storage performance for high bandwidth storage applications by maximizing the use of efficient stripe write operations as compared to prior techniques. The methods of the present invention improve overall subsystem performance while reducing the size of costly cache buffer memory required in the RAID storage subsystem's controller.

It is therefore an object of the present invention to provide methods and associated apparatus for improving RAID storage subsystem performance in the storage of large host computer supplied data buffers.

It is a further object of the present invention to provide methods and associated apparatus for storing large data buffers in a RAID storage subsystem by maximal use of efficient full stripe write operations.

It is still a further object of the present invention to provide methods and associated apparatus for identifying a middle portion of a large I/O write request data buffer which is to be stored in a RAID storage subsystem aligned with stripe boundaries within the subsystem and writing the identified middle portion to the subsystem using full stripe write operations.

It is another object of the present invention to provide methods and associated apparatus for identifying a starting portion of an I/O write request data buffer which is to be stored in a RAID storage subsystem and is nonaligned with stripe boundaries within the subsystem and writing the identified starting portion to cache memory within the subsystem in a write-back cache mode.

It is yet another object of the present invention to provide methods and associated apparatus for identifying an ending portion of an I/O write request data buffer which is to be stored in a RAID storage subsystem and is non-aligned with stripe boundaries within the subsystem and writing the identified ending portion to cache memory within the subsystem in a write-back cache mode.

It is still another object of the present invention to provide methods and associated apparatus for identifying a starting portion of an I/O write request data buffer which is to be stored in a RAID storage subsystem adjacent to a cached ending portion of another I/O write request data buffer and to combine the identified starting and ending portions into a stripe write operation.

It is yet a further object of the present invention to provide methods and associated apparatus for identifying an ending portion of an I/O write request data buffer which is to be stored in a RAID storage subsystem adjacent to a cached starting portion of another I/O write request data buffer and to combine the identified starting and ending portions into a stripe write operation.

The above and other objects, aspects, features, and advantages of the present invention will become apparent from the following description and the attached drawing.

BRIEF DESCRIPTION OF THE DRAWING

FIG. 2 is a table describing an exemplary geometry of a RAID level 5 subsystem as generally known in the art having 5 disk drives;

FIG. 3 is the table of FIG. 2 with additional notations indicative of the mapping of exemplary I/O write requests onto the striped RAID level 5 geometry.

DETAILED DESCRIPTION OF THE PREFERRED EMBODIMENT

Figure 1:
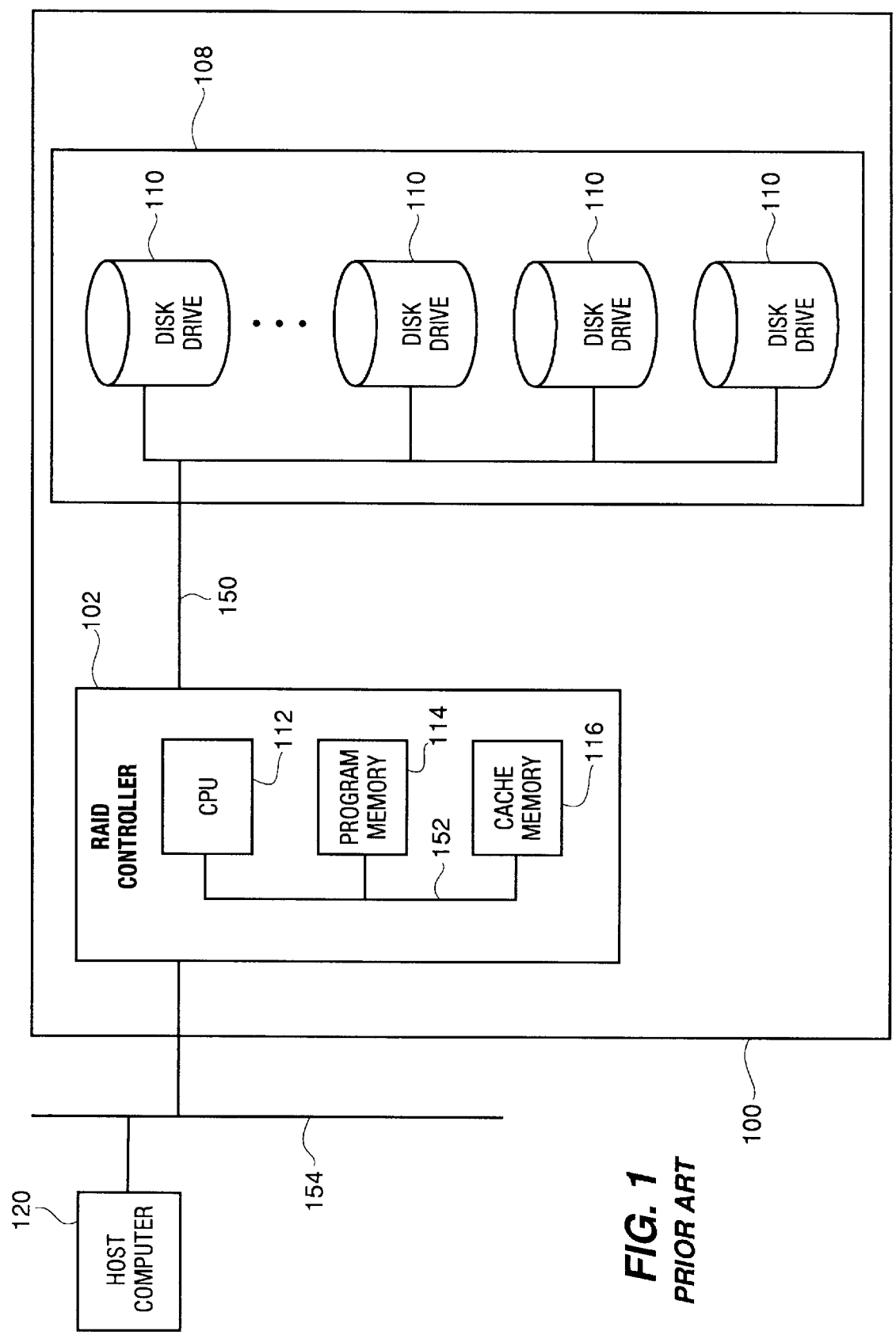
FIG. 1 is a block diagram of a typical RAID storage subsystem as generally known in the art in which the structures and methods of the present invention may be advantageously applied.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

Raid Overview

FIG. 1 is a block diagram of a typical RAID storage subsystem 100 in which the methods and associated apparatus of the present invention may be applied. RAID storage subsystem 100 includes RAID controller 102 which is in turn connected to disk array 108 via bus (or busses) 150 and to host computer 120 via bus 154. Disk array 108 is comprised of a plurality of disk drives 110. One of ordinary skill in the art will readily recognize that interface bus 150 between RAID controller 102 and disk array 108 (including disk drives 110) may be any of several industry standard interface busses including SCSI, IDE, EIDE, IPI, Fiber Channel, SSA, PCI, etc. Circuits (not shown) within RAID controller 102 appropriate to controlling bus 150 are well known to those of ordinary skill in the art. Interface bus 154 between RAID controller 102 and host computer 120 may be any of several standard industry interface busses including SCSI, Ethernet (LAN), Token Ring (LAN), etc. The methods of the present invention are most beneficially applied to SCSI interface connections between one or more host computer systems and the RAID storage subsystem 100. The concept of logical units (as utilized in the methods of the present invention and discussed in detail below) is native to the SCSI interfacing specifications. Other connectivity standards such as LAN may utilize the methods of the present invention if appropriately translated to corresponding structures and protocols associated therewith.

As shown in FIG. 1, RAID storage subsystem 100 may be applied to implement any of the well known RAID levels (e.g. levels 1–5). The various RAID levels are distinguished by the manner in which RAID controller 102 logically subdivides, partitions, and utilizes the disk drives 110 in disk array 108. For example, when implementing RAID level 1 features, approximately half of the disk drives 110 of disk array 108 are used to store and retrieve data while the other half is operated by RAID controller 102 to mirror the data storage contents of the first half. Further, when implementing RAID level 3–5 features, RAID controller 102 utilizes a portion of the disk drives 110 in disk array 108 for the storage of data and the remaining disk drives 110 are utilized for the storage of error checking/correcting information (e.g. parity information). As discussed below, the methods and associated apparatus of the present invention may be applied to the RAID storage subsystem 100 in conjunction with any of the standard RAID levels.

RAID controller 102 includes CPU 112, program memory 114 (e.g. ROM/RAM devices for storing program instructions and variables for the operation of CPU 112), and cache memory 116 for storing data and control information related to the data stored in disk array 108. CPU 112, program memory 114, and cache memory 116 are connected via memory bus 152 to enable CPU 112 to store and retrieve information in the memory devices. The methods of the present invention are embodied as programmed instructions and associated data structures stored within program memory 114 and are retrieved by, and operable within, CPU 112. One of ordinary skill in the art will readily recognize that the block diagram of FIG. 1 is intended only as an exemplary design which may embody the present invention. Many alternate controller and RAID storage subsystem designs may embody the methods and associated apparatus and structures of the present invention.

RAID management computer programs are operable within an attached host computer system to configure and control the operation of the RAID storage subsystem 100. For example, a RAID management program may issue commands to the RAID storage subsystem 100 to configure portions of the disk array 108 to operate according to one RAID level and other portions of the disk array 108 to operate in accordance with another RAID level. Such operational portions of a RAID storage subsystem 100 are often referred to a logical units and identified by an index value called the logical unit number (also referred to herein as LUN). Each LUN within a RAID storage subsystem 100 responds to a host computer system request substantially independent of other LUNs within the RAID subsystem. The RAID management program communicates with the RAID subsystem to perform required administrative tasks outside the bandwidth of the data communications with LUNs corresponding to storage in the disk array 108.

Raid Level 5 Exemplary Geometry

FIG. 2 is a table describing a typical partitioning and utilization of five disk drives 110 of disk array 108 of FIG. 1 for implementing a RAID level 5 device. In accordance with RAID level 5 standards, the disk drives are partitioned into stripes: one block from each of a plurality of disk drives used for one of the plurality of blocks in a stripe. One of the blocks in each stripe is reserved for parity information (or similar error checking redundancy information). The particular disk drive containing the parity block differs between stripes as described in the Patterson article noted above.

FIG. 2 shows an exemplary distribution of ten stripes over the blocks of five disk drives 110 of the disk array 108 of FIG. 1. The collection of all stripes on all five drives of the array shown in FIG. 2 is viewed by an attached host computer as a large (but reliable) single disk drive having a plurality of blocks logically enumerated 1-N (where N is the total number of such blocks in the array). As shown in FIG. 2, stripe 1 is comprised of Block 1 on Disk Drive 1, Block 2 on Disk Drive 2, Block 3 on Disk Drive 3, Block 4 on Disk Drive 4, and the parity block for blocks 1–4 (Parity 1–4) on disk drive 5. Stripe 2 is similarly comprised of four blocks for the storage of data (Blocks 5–8 on Disk Drives 1–3 and 5, respectively) and a parity block (Parity 5–8 on Disk Drive 4). Stripe 3 is likewise comprised of Blocks 9–12 (on Disk Drives 1, 2, 4, and 5, respectively) and a corresponding Parity 9–12 block on Disk Drive 3. Stripes 4–10 are similarly comprised of four data blocks each and a corresponding parity block wherein the physical disk drive used for the parity block in each stripe is shifted in a circular manner with respect to other stripes.

FIG. 3 shows the RAID level 5 exemplary geometry described above with respect to FIG. 2 with a series of sequential I/O write request superposed thereon. A series of write requests (enumerated as 1–4) are received from an attached host computer system for the storage of data in the RAID storage subsystem. As noted above, in a large class of RAID storage applications such as video image capture, each of the sequential I/0 write requests may be very large in comparison with the stripe size of the RAID storage geometry. Each block of an I/O write request depicted in FIG. 3 is enumerated by a letter A–Z indicating the particular block of the large I/O write request. The blocks of data associated with the first I/O write request are therefore labeled as 1-A, 1-B, 1-C, . . . 1-K. In similar fashion, the blocks of the second, third and fourth I/O write requests are labeled as 2-A..2-J, 3-A..3-M, and 4-A..4-D, respectively.

As can be seen in FIG. 3, each exemplary I/O write request provides a number of blocks of data significantly in excess of the number of blocks in the exemplary stripe size depicted by FIGS. 2 and 3. Each I/O write request therefore spans at least one full stripe of the RAID array. Specifically, exemplary write request one spans the entirety of Stripe 2 with blocks 1-C..1-F and the entirety of Stripe 3 with blocks 1-G..1-J, the second write request spans Stripe 5 with blocks 2-D..2-G, and the third I/O write request spans Stripe 8 with blocks 3-F..3-I. The methods of the present invention, described in additional detail below, recognize these conditions wherein a write request (a middle portion of a write request) spans an entire stripe and therefore write those portions of the I/O write request to the disk drives 110 of the disk array 108 (of FIG. 1) using stripe write operations in a cache memory write through mode. This operation is more efficient than standard techniques utilized by prior methods wherein the stripe was written to a cache memory in a write-back mode, or written to the disk array with less efficient read-modify-write operations.

As noted above, in an alternate embodiment of the present invention, the full stripes written to the disk array (cache memory) are written in a write back mode but at a higher priority than other cached write operations. This assures that the full stripes are written (posted) to the disk quickly so as to maintain the benefit of the present invention wherein the required size of cache memory is minimized.

The starting portion of each I/O write request may not be aligned with the beginning of a stripe in the disk array and is therefore written to the cache memory of the RAID controller for later posting to the disk array using standard cache memory write-back techniques. In similar fashion, the ending portion of an I/O write request may not end in alignment with a stripe of the disk array and is stored in the cache memory for later posting to the array. For example, as depicted in FIG. 3, blocks 1-A, 1-B, and 1-K of the first write request are stored in the cache memory for later posting to Blocks 3, 4, and 13, respectively. Similarly, blocks 2-A..2-C and 2-H..2-J of the second I/O write request and block 3-A of the third I/O write request are not aligned with boundaries of stripes of the disk array so as to permit full stripe write operations as discussed above. Rather, these blocks are stored in the cache memory of the RAID controller for later posting to the disk array through normal write-back cache management techniques.

However, methods of the present invention note that the ending portion of one I/O write request and the starting portion of the next I/O write request may abut in such a manner as to permit the use of a stripe write operation to post the cached blocks to the disk array. For example, blocks 1-K and 2-A..2-C of the first and second I/O write requests, respectively, abut in such a manner as to span the entirety of Stripe 4. Methods of the present invention detect this condition to permit use of more efficient stripe write operations to post the cached blocks to the disk array. Similarly, blocks 2-H..2-J and 3-A fully span Stripe 6 to permit methods of the present invention to post cached blocks to the disk array using stripe write operations.

One of ordinary skill in the art will readily recognize that the RAID level 5 geometry described above with respect to FIGS. 2 and 3 is intended only as exemplary. The methods of the present invention (described in additional detail below) are similarly operable on other RAID geometries, having different stripe sizes, and other I/O write request sizes. For example, in typical video capture RAID storage applications, the actual size of an I/O write request would typically be substantially larger than the stripe size thereby enabling the methods of the present invention to efficiently store a plurality of full stripes spanned by the middle portion of the I/O write request data.

Methods of the Present Invention

Figure 4:
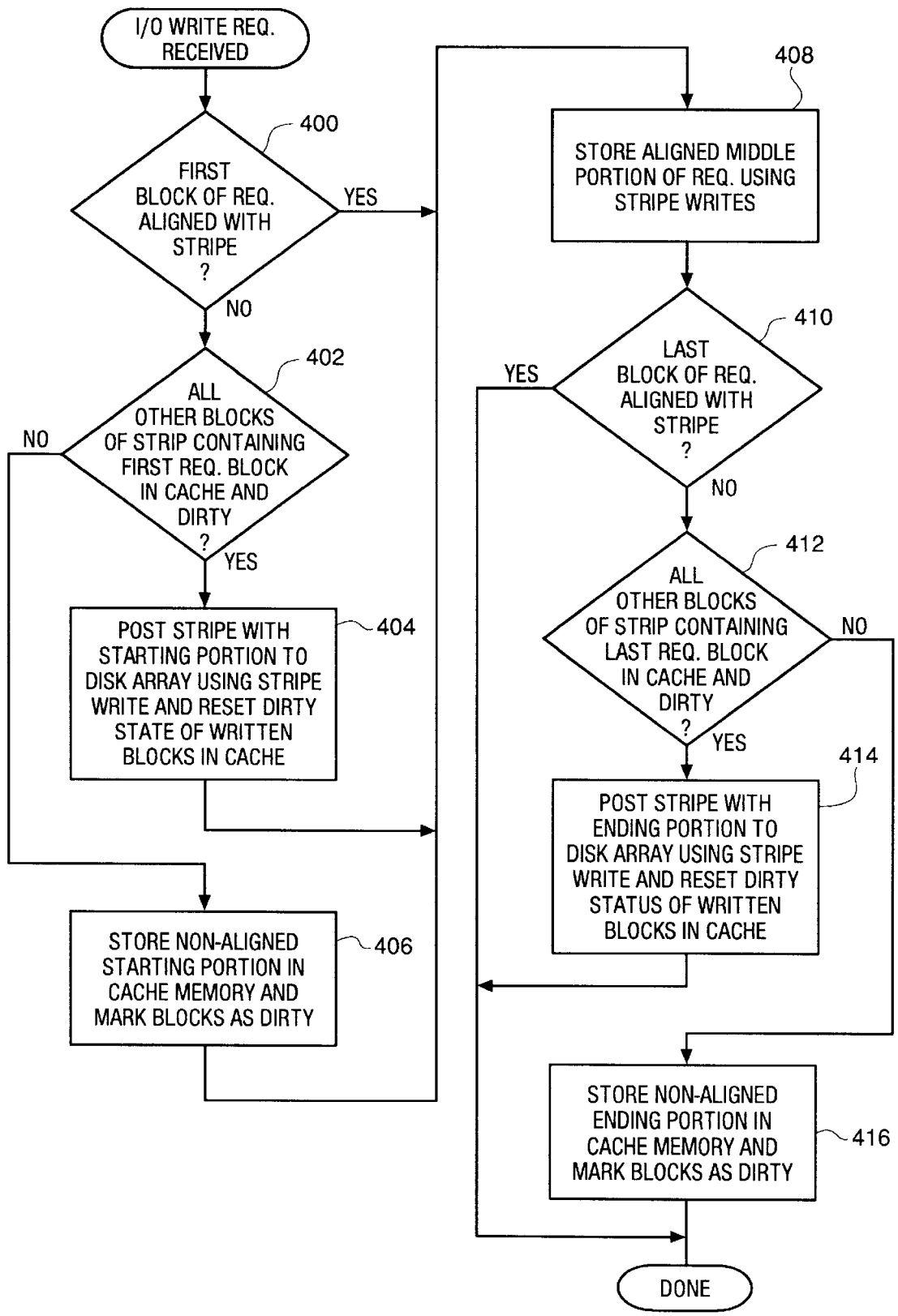
FIG. 4 is a flowchart describing the best presently known mode of implementing the methods of the present invention.

FIG. 4 is a flow chart describing methods of the present invention for improving RAID subsystem performance by maximizing use of full stripe write operations for sequences of large I/O write requests. The methods of FIG. 4 are operable within the RAID controller of the subsystem in response to receipt of an I/O write request from an attached host computer system. Element 400 is first operable to determine whether the first block of the received I/O write request designates a location in the disk array which is aligned with the beginning of a stripe in the disk array. An I/O write request specifies (among other information) the starting location within the disk array at which the supplied data is to be written and the length of the data to be stored therein. The location is typically specified in the form of a starting block number in the disk array while the length of the data is specified in units of blocks.

One of ordinary skill in the art will readily recognize that the term block as used herein means a convenient unit of measure for the particular RAID subsystem implementation, capacity, and application. For example, in some applications and implementations, the block may represent a physical sector of data as determined by the particular disk drive design. In other applications, a block may represent an aggregation (a cluster) of disk drive sectors manipulated together as a common "block." The methods of the present invention are similarly applicable regardless of any particular block size or definition.

If element 400 determines that the first block of the I/O write request data is to be stored at a location which is aligned with the start of a block (e.g., Blocks 1, 5, 9, 13, 17, 21, 25, 29, 33, 37, etc. of the exemplary RAID geometry depicted in FIGS. 2 and 3), then processing continues with element 408 to write all blocks in the I/O write request which span full stripe boundaries of the disk array. Otherwise, processing continues with element 402 to process the blocks in the starting portion of the I/O write request. The starting portion of the I/O write request is that portion of the blocks supplied in the request which start with the first block of the I/O write request data and ends with the last block in the I/O write request buffer which is to be stored in the block of the same stripe of the disk array as the first block of the I/O write request buffer. For example, as shown in FIG. 3, blocks 1-A and 1-B comprise the starting portion of the first I/O write request, blocks 2-A..2-C are the blocks of the starting portion of the second request, and block 3-A is the starting portion of the third I/O write request. The fourth I/O write request (comprising blocks 4-A..4-D) begins aligned with the first block of a stripe: namely, Block 37 of Stripe 10, and therefore has no starting portion.

Element 402 is operable to determine whether all other blocks in the stripe which is to store the starting portion of the I/O write request data are resident in the cache memory of the RAID controller and are "dirty." As used herein, a "dirty" block in the cache memory is one which is yet to be posted to the disk array. In a write-back cache mode of operation, the data may be written to the cache memory to rapidly complete an I/O write request issued by an attached host computer. The data is marked as "dirty" to signify that it has not yet been posted to the disk array for persistent storage. If element 402 determines that all other blocks in the stripe containing the starting portion of the I/O write request are resident in the cache memory and are dirty, processing continues with element 404. Otherwise, processing continues with element 406.

Element 404 is operable in response to element 402's determination that all of the other blocks in the same stripe as the I/O write request's starting portion are resident in cache and dirty. In such a case, element 404 is operable to combine the dirty blocks in the cache memory of the RAID controller located in the same stripe as the starting portion of the I/O write request with the blocks provided in the I/O write request to perform a full stripe write of the corresponding stripe. The blocks provided in the starting portion of the I/O write request when combined with the dirty blocks in the cache memory located in the same stripe span the storage of the associated stripe. The stripe may therefore be written (posted) to the disk array using an efficient full stripe write operation. Element 404 also resets the "dirty" status of all cached blocks posted to the disk array by operation of the full stripe write operation. Processing then continues with element 408.

For example, when processing the second I/O write request shown in the exemplary RAID geometry of FIG. 3, the starting portion of the second I/O write request is comprised of blocks 2-A..2-C. Block 1-K of the first I/O write request was previously written to the cache memory in processing the ending portion of the first I/O write request (discussed in detail below with respect to elements 410–416). If the block still resides in the cache memory and is "dirty" (not yet posted to the disk array), then in combination with blocks 2-A..2-C, the entirety of Stripe 4 is spanned with new data blocks to be written to the disk array. Stripe 4 may therefore be written (posted) to the disk array using a full stripe write operation. The "dirty" status of block 1-K (Block 13) is then reset and the new blocks of the starting portion of the second I/O write request (2-A..2-C) are written to the disk array in a write through mode bypassing the cache memory.

Element 406 is operable in response to element 402's determination that not all of the other blocks in the same stripe as the I/O write request's starting portion are resident in cache and dirty. In such a case, the starting portion cannot at this time, be combined with other dirty buffers in cache memory to perform a stripe write operation. Rather, the blocks of the starting portion of the I/O write request are stored in the cache memory of the RAID controller and will be written to the disk array later in the normal course of operation of the RAID subsystem. In particular, element 406 stores the blocks of the starting portion of the I/O write request in the cache memory of the RAID controller and marks the newly stored blocks as "dirty" for subsequent posting to the disk array in the write-back cache operation of the RAID controller. Processing then continue with element 408.

For example, when the first I/O write request is processed in the exemplary RAID geometry discussed above with respect to FIG. 3, the starting portion of the RAID request is comprised of blocks 1-A and 1-B. However, as shown in FIG. 3, the other blocks of Stripe 1 (Blocks 1 and 2) do not contain dirty data awaiting posting to the disk array. Therefore, the starting portion of the first I/O write request is written to cache memory in a write-back cache mode to await eventual posting to the disk array.

Element 408 is next operable to store the stripe aligned middle portion of the I/O write request on the disk array using full stripe write operations. The stripe aligned middle portion is that portion of the I/O write request buffer which is to be stored starting at a location which is the first block of a stripe and ending with the data stored at a location which is the last block of a stripe in the disk array. This middle portion spans the entirety of at least one stripe of the disk array. In typical applications of the methods of the present invention, such as video capture and storage, the middle portion of I/O write request buffers typically spans a plurality of entire stripes of the disk array. Element 408 is therefore operable to write all such stripes in the disk array which are fully spanned by the middle portion of the I/O write request blocks.

As noted above, in an alternate embodiment of the present invention, the full stripes written to the disk array (cache memory) are written in a write back mode but at a higher priority than other cached write operations. This assures that the full stripes are written (posted) to the disk quickly so as to maintain the benefit of the present invention wherein the required size of cache memory is minimized. Element 408 of FIG. 4 therefore depicts processing for both embodiments: the first, preferred, embodiment in which the full stripes of the aligned middle portion are written to the disk array in a write through mode (the best presently known mode of implementing the present invention), and the second embodiment in which the full stripes of the aligned middle portion are written to the disk array using write back cache memory operation which designate that the stripes are to be posted rapidly to the disk array from the cache memory.

Elements 410–416 are operable to process the non-aligned ending portion of the I/O write request in a manner analogous to elements 400–406 processing of the starting portion of the I/O write request as discussed above. In particular, element 410 is operable to determine whether the last block of the received I/O write request designates a location in the disk array which is aligned with the ending of a stripe in the disk array.

If element 410 determines that the last block of the I/O write request data is to be stored at a location which is aligned with the end of a block (e.g., Blocks 4, 8, 12, 16, 20, 24, 28, 32, 36, 40, etc. of the exemplary RAID geometry depicted in FIGS. 2 and 3), then processing is completed and the completion status for the I/O write request is returned to the user. Otherwise, processing continues with element 412 to process the blocks in the ending portion of the I/O write request. The ending portion of the I/O write request is that portion of the blocks supplied in the request starting with the block following the last block in the middle portion of the I/O write request and ending with the last block specified by the I/O write request. For example, as shown in FIG. 3, block 1-K comprises the ending portion of the first I/O write request and blocks 2-H..2-J are the blocks of the ending portion of the second request. The third and fourth I/O write requests (comprising blocks 3A..3-M, and 4-A..4-D, respectively) both end aligned with the last block of a stripe: namely, Block 36 of Stripe 9, and Block 40 of stripe 10, respectively, and therefore have no ending portions.

Element 412 is operable to determine whether all other blocks in the stripe which is to store the ending portion of the I/O write request data are resident in the cache memory of the RAID controller and are marked as dirty. If element 412 determines that all other blocks in the stripe containing the starting portion of the I/O write request are resident in the cache memory and are dirty, processing continues with element 414. Otherwise processing continues with element 416.

Element 414 is operable in response to element 412's determination that all of the other blocks in the same stripe as the I/O write request's ending portion are resident in cache and dirty. In such a case, element 414 is operable to combine the dirty blocks in the cache memory of the RAID controller located in the same stripe as the ending portion of the I/O write request with the blocks provided in the I/O write request to perform a full stripe write of the corresponding stripe. The blocks provided in the ending portion of the I/O write request when combined with the dirty blocks in the cache memory located in the same stripe span the storage of the associated stripe. The stripe may therefore be written (posted) to the disk array using an efficient full stripe write operation. Element 414 also resets the "dirty" status of all cached blocks posted to the disk array by operation of the full stripe write operation. Processing of the I/O write request is then completed and the completion status is returned to the originating, attached host computer system.

When the ending portion of an I/O write request is ready for processing, it is common that the following starting portion of the next I/O write request has yet to be processed. Normally the third I/O write request would sequentially follow the second, etc. However, there is no requirement under the methods of the present invention that the sequence of receipt of I/O write request must of necessity match the sequence of locations at which the I/O write requests seek to write data. For example, when processing the second I/O write request shown in the exemplary RAID geometry of FIG. 3, if the third request had already been processed previously, the ending portion of the second I/O write request, comprised of blocks 2-H..2-J, would abut the previously cached, and still dirty, starting block of the third I/O write request, namely block 3-A stored in the same Stripe 6 of the disk array. The combination of blocks 2-H..2-J with previously cached block 3-A spans the entirety of Stripe 6 with new data blocks to be written to the disk array. Stripe 6 may therefore be written (posted) to the disk array using a full stripe write operation. The "dirty" status of block 3-A (Block 24) is then reset and the new blocks of the ending portion of the second I/O write request (2-H..2-J) are written to the disk array in a write through mode bypassing the cache memory.

Element 416 is operable in response to element 412's determination that not all of the other blocks in the same stripe as the I/O write request's ending portion are resident in cache and dirty. In such a case, the ending portion cannot, at this time, be combined with other dirty buffers in cache memory to perform a stripe write operation. Rather, the blocks of the ending portion of the I/O write request are stored in the cache memory of the RAID controller and will be written to the disk array later in the normal course of operation of the RAID subsystem. In particular, element 416 stores the blocks of the ending portion of the I/O write request in the cache memory of the RAID controller and marks the newly stored blocks as "dirty" for subsequent posting to the disk array in the write-back cache operation of the RAID controller. Processing of the I/O write request is then completed and the completion status is returned to the originating, attached host computer system.

For example, when processing I/O write requests in the sequential order in which they are received, when the first I/O write request is processed in the exemplary RAID geometry discussed above with respect to FIG. 3, the ending portion of the RAID request is comprised of block 1-K. However, as shown in FIG. 3, the other blocks of Stripe 4 (Blocks 14–16) do not, at the time of processing the first I/O write request, contain dirty data awaiting posting to the disk array. Therefore, the ending portion of the first I/O write request is written to cache memory in a write-back cache mode to await eventual posting to the disk array.

One of ordinary skill in the art will readily recognize that another embodiment of the methods of the present invention may eliminate elements 402–404 and 412–414 of the method described by FIG. 4 while maintaining equivalent functionality. The methods of the present invention in such an alternative embodiment always store the non-aligned starting and ending portions of an I/O write request in the cache memory for later posting in the normal course of write-back cache operation. Though such an alternative embodiment somewhat simplifies the method depicted in FIG. 4, the preferred embodiment described above is believed to further enhance RAID subsystem performance by further increasing the use of efficient stripe write operations. Further, the preferred embodiment of the present invention as described above with respect to FIG. 4 reduces the need to write a particular starting or ending portion of the I/O write request to the write-back cache memory. Rather, the preferred embodiment as described in FIG. 4, skips the writing of a particular starting or ending portion of an I/O write request if the other blocks already resident in the cache memory may be combined with the starting or ending portion to perform a stripe write. The blocks of the starting or ending portion of the I/O write request are thereby written to the disk array in a cache write through mode, bypassing the use of the cache memory therefor.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A method for storing data in a RAID storage subsystem having a plurality of disk drives and a cache memory, said method comprising the steps of:

identifying a middle portion of said data which begins and ends aligned with a stripe of said RAID storage subsystem, wherein said data comprises a data portion of a single I/O write request and is substantially larger than the size of a stripe in said RAID storage subsystem;

identifying a non-aligned starting portion of said data, wherein said non-aligned starting portion includes the start of said data and wherein said non-aligned starting portion ends at the start of said middle portion;

identifying a non-aligned ending portion of said data, wherein said non-aligned ending portion includes the end of said data and wherein said non-aligned ending portion starts at the end of said middle portion; and writing said middle portion to said plurality of disk drives using at least one stripe write operation in a cache memory write through mode.

2. The method of claim 1 wherein the middle portion comprises the largest contiguous portion of said data which begins aligned with a stripe of said RAID storage subsystem and ends aligned with a stripe of said RAID storage subsystem.

3. The method of claim 1 further comprising the steps of:
   writing said non-aligned starting portion to said cache memory; and
   writing said non-aligned ending portion to said cache memory.

4. The method of claim 3 further comprising the steps of:
   identifying a particular non-aligned ending portion of a data written in said cache memory at a location adjacent to the identified non-aligned starting portion; and
   writing said particular non-aligned ending portion and said identified non-aligned starting portion to said plurality of disk drives using a stripe write operation.

5. Associated with a RAID storage subsystem having a plurality of disk drives and a cache memory, a RAID controller comprising:
   means for identifying a middle Portion of said data which begins and ends aligned with a stripe of said RAID storage subsystem, wherein said data comprises a data portion of a single I/O write request and is substantially larger than the size of a stripe in said RAID storage subsystem;
   means for identifying a non-aligned starting portion of said data, wherein said non-aligned starting portion includes the start of said data and wherein said non-aligned starting portion ends at the start of said middle portion:
   means for identifying a non-aligned ending portion of said data, wherein said non-aligned ending portion includes the end of said data and wherein said non-aligned ending portion starts at the end of said middle portion; and
   means for writing said middle portion to said plurality of disk drives using at least one stripe write operation in a cache memory write through mode.

6. The controller of claim 5 wherein the middle portion comprises the largest contiguous portion of said data which begins aligned with a stripe of said RAID storage subsystem and ends aligned with a stripe of said RAID storage subsystem.

7. The controller of claim 5 further comprising:
   means for writing said non-aligned starting portion to said cache memory; and
   means for writing said non-aligned ending portion to said cache memory.

8. The controller of claim 7 further comprising:
   means for identifying a particular non-aligned ending portion of a data written in said cache memory at a location adjacent to the identified non-aligned starting portion; and
   means for writing said particular non-aligned ending portion and said identified non-aligned starting portion to said plurality of disk drives using a stripe write operation.

9. A method for storing data in a RAID storage subsystem having a plurality of disk drives and a cache memory, said method comprising the steps of:
   identifying a middle portion of said data which begins and ends aligned with a stripe of said RAID storage subsystem, wherein said data comprises a data portion of a single I/O write request and is substantially larger than the size of a stripe in said RAID storage subsystem;
   identifying a non-aligned starting portion of said data, wherein said non-aligned starting portion includes the start of said data and wherein said non-aligned starting portion ends at the start of said middle portion;
   identifying a non-aligned ending portion of said data, wherein said non-aligned ending portion includes the end of said data and wherein said non-aligned ending portion starts at the end of said middle portion;
   writing said middle portion to said cache memory with indicia of a high priority; and
   writing said middle portion from said cache memory to said plurality of disk drives using at least one stripe write operation, wherein said writing of said middle portion occurs prior to writing of other information from said cache memory having indicia of lower priority relative to said indicia of high priority associated with said middle portion.

10. The method of claim 9 wherein the middle portion comprises the largest contiguous portion of said data which begins aligned with a stripe of said RAID storage subsystem and ends aligned with a stripe of said RAID storage subsystem.

11. The method of claim 9 further comprising the step of:
    writing said non-aligned ending portion to said cache memory.

12. The method of claim 11 further comprising the steps of:
    identifying a particular non-aligned ending portion of a data written in said cache memory at a location adjacent to the identified non-aligned starting portion; and
    writing said particular non-aligned ending portion and said identified non-aligned starting portion to said plurality of disk drives using a stripe write operation.

13. Associated with a RAID storage subsystem having a plurality of disk drives and a cache memory, a RAID controller comprising:
    means for identifying a middle portion of said data which begins and ends aligned with a stripe of said RAID storage subsystem, wherein said data comprises a data portion of a single I/O write request and is substantially larger than the size of a stripe in said RAID storage subsystem;
    means for identifying a non-aligned starting portion of said data, wherein said non-aligned starting portion includes the start of said data and wherein said non-aligned starting portion ends at the start of said middle portion;
    means for identifying a non-aligned ending portion of said data, wherein said non-aligned ending portion includes the end of said data and wherein said non-aligned ending portion starts at the end of said middle portion;
    means for writing said middle portion to said cache memory with indicia of a high priority; and
    means for writing said middle portion from said cache memory to said plurality of disk drives using at least one stripe write operation, wherein said writing of said middle portion occurs prior to writing of other information from said cache memory having indicia of lower priority relative to said indicia of high priority associated with said middle portion.

14. The controller of claim 13 wherein the middle portion comprises the largest contiguous portion of said data which begins aligned with a stripe of said RAID storage subsystem and ends aligned with a stripe of said RAID storage subsystem.

15. The controller of claim 13 further comprising:

means for writing said non-aligned ending portion to said cache memory.

16. The controller of claim 15 further comprising:

means for identifying a particular non-aligned ending portion of a data written in said cache memory at a location adjacent to the identified non-aligned starting portion; and means for writing said particular non-aligned ending portion and said identified non-aligned starting portion to said plurality of disk drives using a stripe write operation.

* * * * *